Figure 1:
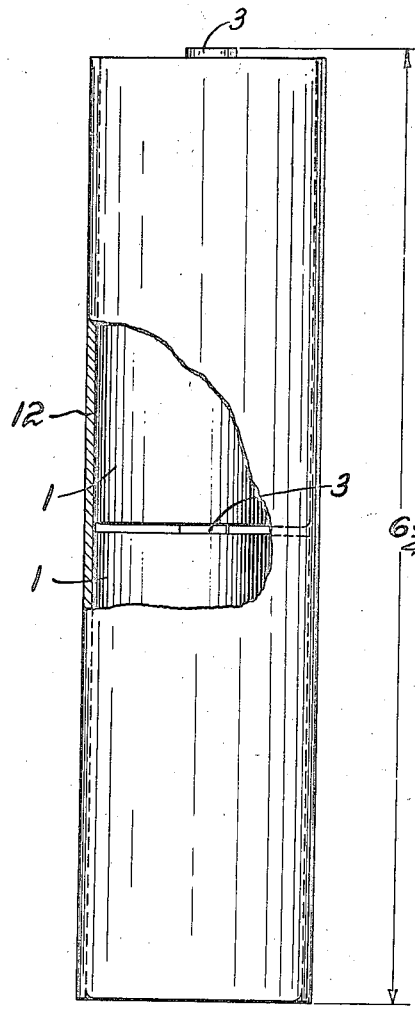

A. S. LYHNE.
ELECTRIC BATTERY CELL.
APPLICATION FILED MAY 16, 1921.

1,432,347.

Patented Oct. 17, 1922.

INVENTOR.
Anker S. Lyhne
BY
ATTORNEY

Patented Oct. 17, 1922.

1,432,347

UNITED STATES PATENT OFFICE.

ANKER S. LYHNE, OF BRIDGEPORT, CONNECTICUT.

ELECTRIC BATTERY CELL.

Application filed May 16, 1921. Serial No. 469,759.

*To all whom it may concern:*

Be it known that I, ANKER S. LYHNE, a citizen of the United States, residing at Bridgeport, county of Fairfield, State of Connecticut, have invented an Improvement in Electric Battery Cells, of which the following is a specification.

This invention relates to electric battery cells and has particular reference to what are known as bag type flash light batteries commonly used in small portable pocket and hand flash lights, extension lights, etc., with corresponding types of holders or cases.

The main objects of this invention are to provide a more efficient size of battery for general use than is now available, and at the same time a size of wider range of usefulness and adaptability than any now on the market, thereby requiring a less number of sizes, cases, and holders to be manufactured by the maker, and a less number of sizes, cases and holders to be carried in stock by dealers.

At the present time, the two largest selling sizes of dry batteries are the large 1-1/2 volt standard size, of about 2-1/2" diameter by 6" long, used for door-bells, ignition, etc., and occasionally in portable holders or with a lamp and reflector attachment for detached illumination, and the small 1-1/2 volt standard size of about 1-1/4" diameter and 2-1/3" long, occasionally used singly in a small holder, but more generally in series of two or more with lamp of corresponding voltage, in a longer holder, for flash light and general detached illumination. The large standard cell is not generally considered a flashlight battery because of its size and weight, but may be considered as a standard of performance in shelf life and burning life for smaller batteries, the effort in making the smaller sizes being to produce as nearly the same shelf life, and the same relative burning life, as possible. That is to say, the burning life is generally a function of the amount of active electro-positive material (zinc) present, but the shelf life depends not only upon the zinc but upon the volume and character of the electrolytic paste, and the electro-negative element, which latter comprises a carbon rod surrounded by a depolarizing mixture wrapped in loosely woven textile material.

The matter of shelf life is very important, because while manufacturers generally guarantee their goods for a specified time, the dealers do not always dispose of the goods within the guarantee period, so that it is desirable in any event to prolong the shelf life as much as possible. This is also of advantage to the customer who uses a light irregularly or infrequently.

Furthermore, better illuminating service is secured from 3 volt batteries than from 1-1/2 volt batteries such as ignition batteries, so that it becomes desirable to furnish either single batteries and holders or holders putting two batteries in series, that is to furnish batteries in units of two in series only, requiring simple insertion in the holder or case ready for use. These holders are generally of cylindrical form, having a lamp, socket and reflector at one end, and a closure cap at the other end, with a switch on the side, as shown in my Patent #1,183,310, dated May 16, 1916. There are practical limits to the size of such holders, depending upon the weight, length, and diameter, as the public will not generally use the large sizes, but demands better shelf and burning life without objectionably increasing the size, for example, a holder capable of holding two large standard 6 inch batteries side by side or end to end, is too large and heavy.

After an extensive investigation of the problem from the standpoints of the manufacturers of holders and batteries, the dealers who stock the batteries, and the users of holders and batteries, with a view to the production of a cell best meeting the requirements of cost of production, burning life, shelf life, and convenience, I have discovered a solution of the problem by a novel proportioning of dimensions. I have found that by changing the proportion of length to diameter, as compared with the above mentioned small standard battery, that the shelf life will be approximately doubled, the burning life increased four to six times, the labor cost will be reduced approximately one third, with the total cost about doubled. This produces a battery considerably smaller than the large standard battery, but which will do the same work, and have about the same shelf and burning life. This enables my new cell or battery to be shipped in cartons containing one or more, whereas large standard batteries usually require to be shipped in barrels or heavy cases.

The accompanying drawing illustrates a battery embodying the invention, wherein—

Figure 3:
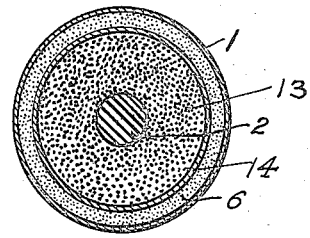
Figure 2:
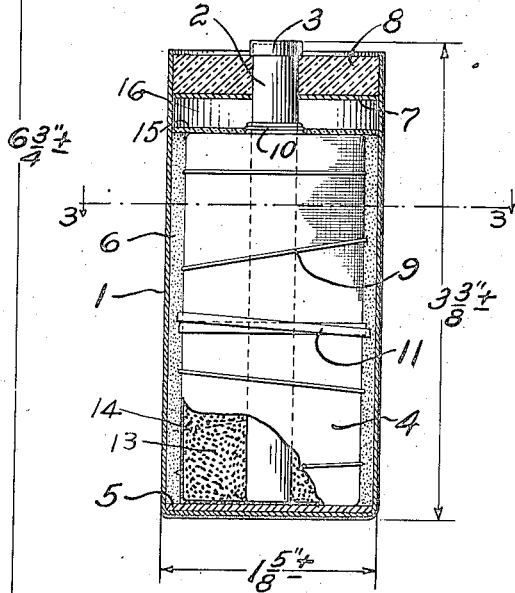

Fig. 1 is an elevation of a two cell battery, ready for a flashlight case;

Fig. 2, a vertical sectional view of my new cell, the electro-negative element being in elevation; and Fig. 3 is a transverse section of the cell.

1 indicates the electro-positive element, preferably a drawn zinc cup, 2 the carbon rod, with metal ferrule 3 and 4, the electro-negative element, consisting of a muslin bag containing the usual commercial or a special depolarizing mixture around the carbon rod and in good electrical contact therewith. The electro-negative element is separated from the electro-positive element, as by a washer 5 of paraffined paper at the bottom, and from the sides by a surrounding layer of electrolytic paste indicated by 6. Above the electro-negative element and the surrounding layer of electrolytic paste is a transverse layer of paraffin indicated by 15, above the layer of paraffin is an air space, indicated by 16, above the air space is a paper collar 7, which fits the carbon rod and the zinc cup closely, and above the paper washer is a layer 8 of sealing composition which comes slightly below the edge of cup 1. The electro-negative element is formed under pressure in a mold, and has thread wrappings 9, 10, at the sides and top respectively to hold the muslin wrapping 14 closed. 11 is an insulating side separator, as a rubber band to act in case the bobbin should be accidentally set off center in assembling.

In Figure 1, two of such cells are shown held in a wrapper or tube of paper or thin card board ready for use in a 3 volt series.

In the small standard cell above referred to used herein for comparison with mine, the comparative dimensions are as follows, the first column being for the former and the second column for mine.

| | Small standard cell. | Lyhne new cell. |
|---|---|---|
| Ratio of outside diameter to height of zinc shell | 1 : 1.78 | 1 : 2.07 |
| Inside diameter zinc shell | 1.195 ″ | 1.595 ″ |
| Outside diameter zinc shell | 1.25 ″ | 1.625 ″ |
| Height of shell | 2.1875 ″ | 3.375 ″ |
| Weight of active zinc | .0215 lb. | .049 lb. |
| Width of annular space between bobbin and cup | .0975 | .095 ″ |
| Cross section area of bobbin | .7854 sq. ″ | 1.5526 sq. ″ |
| Capacity | 1.227 cu. ″ | 3.88 cu. ″ |
| Area of active surface | 5.98 sq. ″ | 12.65 sq. ″ |
| Diameter of carbon | .3125 ″ | .3125 ″ |
| Height of bobbin | 1.5625 ″ | 2.50 ″ |
| Diameter of bobbin | 1.00 | 1.406 |
| Ratio of diameter of bobbin to length | 1 : 1.56 | 1 : 1.77 |
| Weight of electrolyte per cell | .024 lb. | .049 lb. |

My battery constructed as above specified in the last column, embodies as I believe the best proportions and dimensions for the purposes specified, but it is to be understood that the proportions and dimensions given are not absolute, as reasonable variations may be made in, for example, external diameter and length of the cell without departing from the invention or substantially changing the characteristics of my novel battery. I have found that an increase or decrease of 1/8″ in diameter, or about 8%, and an increase in length 1/4″, or about 8%, does not materially change the result. Generally, the most important factor is diameter, but too much length or diameter makes the cases for three volt batteries too cumbersome and clumsy to be satisfactory to users. The reason why I am not restricted to exact proportions is that any battery has one or more constants or factors which do not change proportionately to changes in dimensions, such as minimum cross section of carbon necessary for strength and low resistance, and area of inactive zinc surface at the bottom and top. With the proportions I have worked out as stated herein, such constants or factors have a minimum effect on the burning and shelf life, and on the final design. At the same time this design permits low manufacturing costs measured on the basis of unit output and performance, because of the greater efficiency of this design owing to the novel corelation of diameter to length worked out by me.

A two cell battery as shown in Figure 1 has a fiber or paper tube 12 to hold the units together in series end to end, and is especially adapted for flashlight cases, since the diameter is not too large, and the increased length and weight are not objectionable to the user, in view of the advantages obtained.

What I claim is:

1. A dry battery cell comprising an electro-positive cup element containing an electro-negative element, consisting of a carbon rod and depolarizing mixture, and electrolytic paste surrounding the electro-negative element, the diameter of the cup being related to its length in the proportion of approximately 1 to 2.07.

2. A dry battery cell comprising an electro-positive cup element containing an electro-negative element, the diameter of the cup being related to its length in the proportion of approximately 1 to 2.07, the cup containing an electro-negative element consisting of a carbon rod and depolarizing mixture wrapped in muslin, the diameter of the electro-negative element being related to its length in the proportion of approximately 1 to 1.77.

3. A cylindrical dry battery cell comprising an electro-positive cup element containing the electro-negative element, and an electrolyte, and sealed at the top, the cup being approximately 1-5/8″ diameter and 3-3/8″ long.

4. A cylindrical dry battery cell comprising an electro-positive cup element containing the electro-negative element and an electrolyte, and sealed at the top, the electro-negative element being approximately 1-4/10″ diameter and 2-1/2″ long.

5. A cylindrical dry battery cell comprising an electro-positive cup element containing the electro-negative element and an electrolyte, and sealed at the top, the cup being approximately 1-5/8″ in diameter and 3-3/8″ long, and the electro-negative element being approximately 1-4/10″ diameter and 2-1/2″ long.

6. A dry battery cell of greater length and diameter than a small standard cell of known length and diameter wherein the length is related to the diameter in the proportion of approximately 1.78 to 1, having approximately one and one-half the length of said standard cell, and the electro-positive element having substantially twice the area of that of the standard cell, whereby four times the life of the standard cell is obtained.

In testimony whereof I affix my signature.

ANKER S. LYHNE.